Patented Mar. 14, 1944

2,344,321

UNITED STATES PATENT OFFICE 2,344,321

CONDENSATION PRODUCTS OF SULPHONIC ACID AMIDES AND SULPHONIC ACID HYDRAZIDES AND A PROCESS OF PREPARING THEM

Ludwig Orthner, Frankfort - on - the - Main, Gerhard Balle, Frankfort-on-the-Main-Sud, and Heinz Schild, Frankfort-on-the-Main-Hochst, Germany, assignors, by mesne assignments, to General Aniline & Film Corporation, New York, N. Y., a corporation of Delaware No Drawing. Application December 23, 1938, Serial No. 247,395. In Germany December 24, 1937

9 Claims. (Cl. 260—296)

The present invention relates to condensation products of sulphonic acid amides and sulphonic acid hydrazides and to a process of preparing them.

We have found that condensation products which possess a capillary activity can be obtained from sulphonic acid amides and sulphonic acid hydrazides by causing formaldehyde to act in the presence of a tertiary base or of a thiourea as well as of an acid or an acid anhydride on sulphonamides or sulphonhydrazides which have at least one exchangeable hydrogen atom bound to the amide-nitrogen and, moreover, contain a hydrocarbon radical having at least 4 carbon atoms which may contain substituents and/or be interrupted by at least one hetero-atom or heteroatom group.

A modification of the process for the preparation of the above-named products consists in causing the methylol compounds obtained from the above-defined sulphonamides or sulphonhydrazides by the action of formaldehyde in the presence of an alkaline agent, to react with salts of tertiary bases or of thiourea or by causing the methylol compounds to react with tertiary bases or a thiourea in the presence of an acid or an acid anhydride.

Also the reaction of a halogen methyl compound of the sulphonamide or sulphonhydrazide with a tertiary base or a thiourea leads to the condensation products constituting the subject matter of the present invention.

The process may be conducted without use of a solvent in all cases in which a liquid or an easily fusible sulphonamide or sulphonhydrazide is used. In these cases a simple mixing of the components and, if necessary, a feeble heating of the mixture suffices for the reaction. In other cases it is of advantage to use a solvent. As solvents may be used: water or an organic solvent, such as benzene, toluene, xylene, chlorobenzene, methylene chloride, ethylene chloride, carbon tetrachloride.

The reaction temperature may vary within wide limits. Generally a temperature not exceeding about 100° C. to 120° C. is applied.

The sulphonamides to be used may be substituted in various manner. There may be mentioned: butylsulphonamide, isohexylsulphonmethylamide, methylsulphonbutylamide, dodecylsulphonamide, octadecylsulphonamide, 12-chloroctadecylsulphonamide, 9.10 - dichloroctadecylsulphonmethylamide, dodecylhydroxyethanesulphonamide, para-tertiary-octylphenoxy-ethanesulphonamide, para-tertiary-butylphenóxyethanesulphon - N - caprylamide, toluenesulphonamide, para-butylbenzenesulphonamide, naphthalenedisulphonamide, para-butylphenylbutylsulphonamide, para-butylcyclohexylethylsulphonamide, naphthenesulphonamide and the corresponding hydrazides.

Among the tertiary bases, which may be used for the process, there may be named: pyridine and its homologues, quinoline, trimethylamine, triethylamine, tributylamine, triethanolamine, methylmorpholine, methylpiperidine, dimethylaniline, tetramethylmethylenediamine, tetramethylethylenediamine, hexamethylenetetramine. As thioureae suitable in the present process there may be mentioned thiourea and its substitution and acylation products, for instance methylthiourea, dimethylphenylthiourea, ethylenethiourea, butoxymethylthiourea, acetylthiourea, octadecylthiourea, para-butylphenyloxyethylthiourea.

The acid used in the process may be inorganic or organic, for instance, hydrochloric acid, hydrobromic acid, sulphurous acid, sulphuric acid, phosphoric acid, pyrophosphoric acid, pyrosulphuric acid, sulpho-acetic acid, sulpho-phthalic acid, chlorobenzoic acid, lactic acid. Instead of these acids there may be also be used their anhydrides, phosphorus pentoxide, $SO_3$, acetic anhydride, succinic anhydride, phthalic anhydride or the acid salts thereof, such as sodium bisulphate, primary sodium phosphate, secondary sodium pyrophosphate, the acid salts of phthalic acid or of succinic acid.

The new compounds are generally solid to semisolid products of wax- or lard-like character, soluble in water and easily dispersable therein. Generally they are colorless or feebly colored. They are capillary active and may be used for the treatment of materials, particularly textiles, fibers, paper, leather plastic masses or the like.

The following examples serve to illustrate the invention but they are not intended to limit it thereto; the parts are by weight:

(1) 333 parts of octadecylsulphonamide are heated at 90° C. to 95° C. for 8 hours together with 50 parts of formaldehyde and 130 parts of pyridine hydrochloride in 800 parts of pyridine serving as a solvent. The pyridine not used for the formation of the condensation product is evaporated under reduced pressure and the condensation product remains as a lard-like water-soluble product probably of the formula:

$C_{18}H_{37}SO_2NH\ CH_2.(C_5H_5N)Cl$

On heating the aqueous solution or adding a solution of sodium carbonate, decomposition occurs with separation of insoluble products.

If the equivalent quantity of pyridine hydrobromide is used instead of pyridine hydrochloride, a product is obtained which in its outward appearance, as regards solubility and instability, resembles nearly completely to the choloride.

The octadecylsulphamide is obtained by causing liquid ammonia to react in a known manner upon octadecylsulphochloride which has been prepared as described by Sprague & Johnson in "Journal of American Chemical Society," vol. 59, page 2439.

(2) a fraction of hydrocarbons obtained during the hydrogenation of carbon monoxide according to Fischer-Tropsch and having a length of chain of about 14 carbon atoms is transformed into the sulphochloride by a simultaneous action of gaseous sulphur dioxide and chlorine and a radiation with ultra-violet light. A tetradecylsulphonamide is obtained by a known method, for instance by the action of liquid ammonia. Gaseous sulphur dioxide is introduced at a temperature of 90° C.-95° C., while stirring, into a mixture of 60 parts of this sulphonamide, 15 parts of paraformaldehyde and 80 parts of pyridine until a test has become soluble in water; this requires about 2 hours. After the pyridine has been distilled under reduced pressure, there is obtained a compound of the probable formula:

$C_{14}H_{29}SO_2NH\ CH_2.(C_5H_5N).SO_3.(C_5H_5N)$ in the form of a reddish, water-soluble oil which decomposes on heating.

(3) 333 parts of octadecylsulphonamide are heated in a water bath at about 95° C. for about 6 hours, while well stirring, together with 60 parts of paraformaldehyde, 148 parts of phthalic anhydride and 500 parts of pyridine. When a test portion dissolves in water to a nearly clear solution, the pyridine not used for the formation of the condensation product is evaporated under reduced pressure and the condensation product remains as a paste which yields a foam when shaken with water.

(4) 30 parts of tetradecylsulphonamide obtained as described in Example 2, 6 parts of paraformaldehyde, 24 parts of diglycolic anhydride, and 50 parts of pyridine are heated for about ¾ hour to 85° C.–90° C., while stirring. After the mixture has been dried under reduced pressure, a yellow, honey-like product is obtained which dissolves in water with a slight turbidity and decomposes on heating to a raised temperature.

If the equivalent quantity of phthalic anhydride is used in this example instead of diglycolic anhydride, a product is obtained which dissolves in water with a slight turbidity and decomposes on addition of alkali or when being boiled.

(5) 33 parts of octadecylsulphonamide are heated at 90° C. to 95° C. for about 1 to 2 hours, while well stirring, together with 3.5 parts of paraformaldehyde and 15 parts of sodium bisulphate in 100 parts of pyridine. The pyridine not used for the formation of the condensation product is evaporated and a solid substance remains which is soluble in water.

(6) 327 parts of dodecylchloromethylsulphonamide are dissolved in 1000 parts of methylene chloride and 100 parts of pyridine are added, while cooling. After evaporating the methylene chloride, there is obtained a lard-like mass which dissolves in water to a clear solution. On boiling the aqueous solution or adding sodium carbonate, decomposition of the condensation product occurs with separation of insoluble products.

The dodecylchloromethylsulphamide is obtained according to known methods, for instance by the action of liquid ammonia, from the dodecylsulphochloride prepared as described by Sprague & Johnson in "Journal of the American Chemical Society," vol. 59, page 2439.

(7) 342 parts of dodecyl-methyl-chloromethylsulphonamide

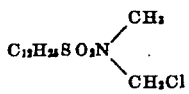

are reacted in an analogous manner as described in Example 6 with 60 parts of thiourea dissolved in 200 parts of alcohol. The product obtained is sparingly soluble in water.

(8) 38 parts of n-propyl-N-n-octadecylsulphonamide obtained by the reaction of n-propylsulphochloride with n-octadecylamine, are suspended in about 150 parts of benzene together with 4 parts of paraformaldehyde. Gaseous hydrochloric acid is introduced into the suspension at room temperature, while stirring, until dissolution has occurred. 6 parts of tetramethylethylenediamine are gradually added at room temperature, to the solution after it has been dried with sodium sulphate and filtered; stirring is continued for several hours. After the solvent has been distilled under reduced pressure, a wax-like mass is obtained which is only sparingly soluble in water.

(9) 30 parts of tetradecylsulphonamide obtained as described in Example 2 and 6 parts of paraformaldehyde are added to 250 parts of methylene chloride; gaseous hydrochloric acid is then introduced at room temperature until dissolution has occurred. 16 parts of thiourea are gradually stirred at room temperature into the solution dried with calcium chloride and filtered. After about 8 to 10 hours the solvent is distilled, finally under reduced pressure. A hygroscopic powder is obtained which is very readily soluble in methanol and readily dissolves in water with a slight turbidity. The product decomposes on addition of sodium carbonate solution. It corresponds probably to the formula

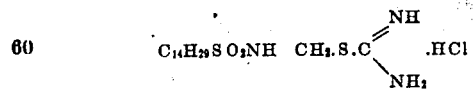

If hydrogen bromide is used instead of hydrogen chloride a product is obtained which as regards appearance, solubility and instability is similar to the aforenamed product.

(10) If 16 parts of pyridine are used instead of 16 parts of thiourea and the process is performed as described in Example 9, a viscous, yellow oil is obtained which readily dissolved in methanol with a clear solution, dissolves in water with a slight turbidity, discolors on addition of sodium carbonate solution and decomposes on boiling of the sodium carbonate solution with separation of insoluble products.

When 28 parts of hexamethylenetetramine are used instead of 16 parts of thiourea and the process is performed as described in Example 9, a white powder is obtained, which readily dissolves in water and methanol and decomposes on addition of sodium carbonate.

(11) The reaction product of SO₂ and chlorine on hard paraffine is reacted with ethylenediamine while it is exposed to the radiation with ultra-violet light. There is obtained a compound of the probable formula $$RSO_2NHCH_2CH_2NHSO_2R$$

wherein R stands for hard paraffine with about 24 carbon atoms.

87 parts of this product 200 parts of pyridine, 8 parts of paraformaldehyde and 4 parts of hydrochloric acid are heated for about 3 hours at 80° C. to 85° C., while stirring. After the excess of pyridine has been distilled under reduced pressure, a salvy product is obtained which readily emulsifies in water with a strong evolution of foam.

(12) Para-isododecylcylohexanol is condensed with sodium chloroethanesulphonate according to Schotten-Baumann. By the reaction with phosphorus pentachloride by way of the corresponding sulphochloride and by a subsequent treatment with liquid ammonia there is obtained therefrom the compound of the following formula:

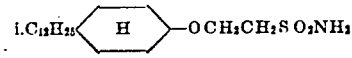

38 parts of this compound, about 100 parts of pyridine, 4 parts of paraformaldehyde and 14 parts of dichloroacetic acid are heated for 4 hours at 80° C. to 85° C., while stirring. After the excess of pyridine has been distilled under reduced pressure, a salvy product is obtained which readily emulsifies in water with a strong evolution of foam.

(13) 34 parts of para-toluenesulphonamide and 12 parts of paraformaldehyde are treated at room temperature in 200 parts of methylene chloride by introducing hydrochloric acid gas until dissolution has occurred. The solution dried with calcium chloride and filtered is gradually mixed at room temperature with 20 parts of thiourea and stirred for 14 hours. The solution is filtered with suction and dried under reduced pressure. A loose white powder is obtained which is readily soluble in methanol and water and probably has the formula:

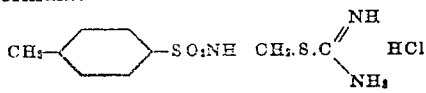

(14) 34 parts of paratoluene-N-n-dodecyl-sulphamide and 4 parts of paraformaldehyde are introduced into 200 parts of benzene and into the mixture hydrochloric acid gas is introduced at room temperature, while stirring, until dissolution has occurred. The solution dried with calcium chloride and filtered is gradually mixed with 16 parts of pyridine at about 35° C. After the solvent has been distilled under reduced pressure, a viscous oil is obtained which is well dispersed in water and foams strongly.

(15) 34 parts of paratoluenesulphonamide, 12 parts of paraformaldehyde, 12 parts of diglycolic anhydride and 16 parts of pyridine are heated for about 3 hours to 60° C.-70° C. There is obtained a viscous oil which is readily soluble in water.

(16) 10 parts of paratoluenesulphonmethylol-amide obtained for instance according to the process described in German Patent No. 403,718, 50 parts of methanol, 6 parts of trimethylamine and 5 parts of concentrated sulphuric acid are heated together for about 1 hour to 60° C.-65° C. After the methanol has been distilled under reduced pressure there is obtained a vaseline-like mass which readily dissolves in methanol and water and is decomposed on addition of sodium carbonate solution.

(17) 1-stearoylamino-2-nitro-4-benzenesulph-amide of the formula

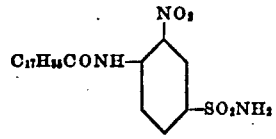

is obtained by acylation of 1-amino-2-nitro-4-benzenesulphamide with stearic acid chloride according to known processes. 24 parts of the compound obtained is reacted in 150 parts of methylene chloride with 3 parts of paraformaldehyde by introducing hydrochloric acid gas at about 30° C., until dissolution has occurred. The solution dried with calcium chloride and filtered is gradually mixed with 16 parts of thiourea and the mixture is stirred for some hours. After the solvent has been distilled, a yellow resin-like product remains which readily dissolves in methanol, dissolves in water with a slight turbidity and decomposes on addition of sodium carbonate.

(18) 12 parts of 1-methoxy-2-nitro-4-benzene-sulphamide are suspended in about 170 parts of methylene chloride and 3 parts of paraformaldehyde are added to the suspension. Hydrochloric acid gas is introduced at room-temperature until dissolution has occurred. 16 parts of pyridine are gradually run to the solution dried with calcium chloride and filtered. The whole is stirred for about 12 hours. The solvent is then distilled, finally under reduced pressure. There is obtained a yellow powder which is strongly hygroscopic and readily dissolves in methanol and water.

(19) 43 parts of hard paraffine sulphonic acid-N-methylamide, obtained from the reaction product of gaseous SO₂ and chlorine during the radiation with ultraviolet light upon hard paraffine and methylamine, are heated to boiling, while stirring, together with 4 parts of paraformaldehyde and 11 parts of trimethylamine hydrochloride in about 200 parts of benzene. After some hours the solvent is distilled, finally under reduced pressure. There is obtained a wax-like product probably of the formula

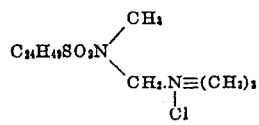

which in water yields strongly foaming emulsions.

We claim:
1. The products of the general formula:

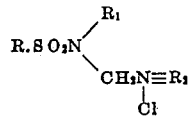

wherein R stands for an aliphatic hydrocarbon radical of at least 4 carbon atoms, R₁ stands for a member of the group consisting of hydrogen and alkyl radicals and N≡R₂ stands for a tertiary base.

2. The product of the formula:

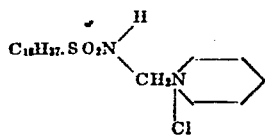

3. The product of the formula:

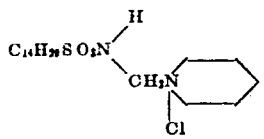

4. The product of the formula:

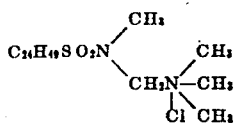

5. Quaternary ammonium methylene sulphonamides of the formula

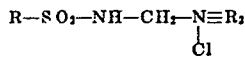

wherein R is an alkyl radical of at least 8 carbon atoms and N≡R₂ is a tertiary amine.

6. Quaternary ammonium methylene sulphonamides of the formula

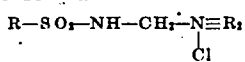

wherein R is an alkyl radical of at least 8 carbon atoms and N≡R₂ is a tertiary aliphatic amine.

7. The process of producing compounds of the following formula

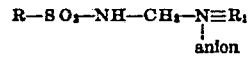

wherein R is an alkyl radical of at least 8 carbon atoms and —N≡R₁ is a tertiary amine which comprises heating a compound of the following formula $$R-SO_2-NH-CH_2OH$$

(wherein R has the above value) with a tertiary nitrogenous base in the presence of a salt of said base.

8. The process as defined in claim 6, wherein said base is aliphatic.

9. The process of producing the following compound

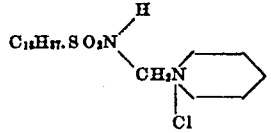

which comprises heating the compound

with pyridine in the presence of pyridine hydrochloride.

LUDWIG ORTHNER.
GERHARD BALLE.
HEINZ SCHILD.

Certificate of Correction

Patent No. 2,344,321. March 14, 1944.

LUDWIG ORTHNER ET AL.

It is hereby certified that error appears in the printed specification of the above numbered patent requiring correction as follows: Page 4, second column, line 17, claim 8, for the claim reference numeral "6" read 7; and that the said Letters Patent should be read with this correction therein that the same may conform to the record of the case in the Patent Office.

Signed and sealed this 6th day of May, A. D. 1947.

[SEAL]

LESLIE FRAZER,
*First Assistant Commissioner of Patents.*